June 22, 1926.
F. F. MARQUARD
1,589,809
METHOD OF RECOVERING AMMONIUM SULPHATE
Filed Feb. 5, 1925
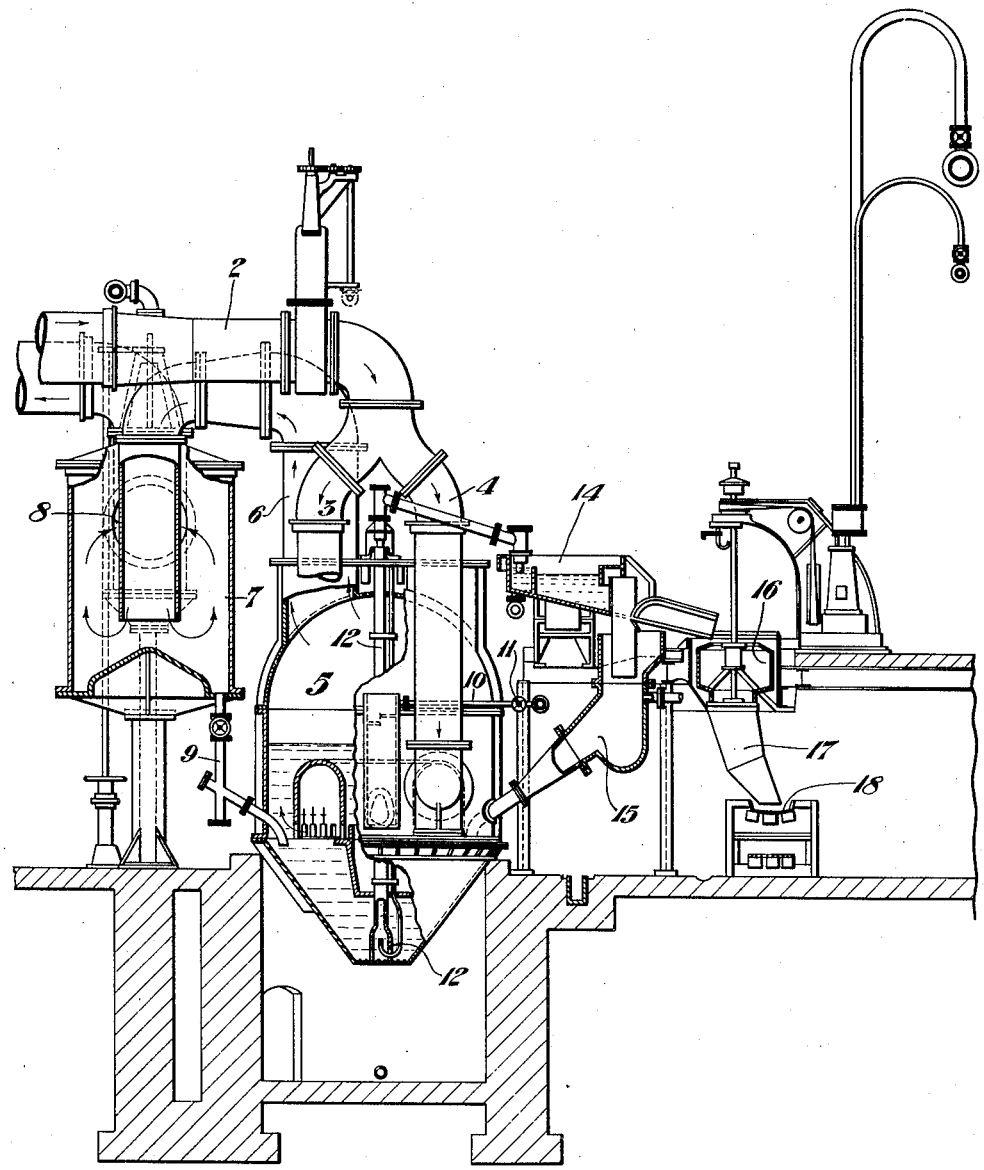
Witnesses:
Edwin Trueb
Inventor:
FRANK F. MARQUARD,
by D. Anthony Usina
his Attorney.

Patented June 22, 1926.

1,589,809

UNITED STATES PATENT OFFICE.

FRANK F. MARQUARD, OF CLAIRTON, PENNSYLVANIA.

METHOD OF RECOVERING AMMONIUM SULPHATE.

Application filed February 5, 1925. Serial No. 7,067.

This invention relates to the recovery of ammonium sulphate from by-product coke and similar gases by passing the gases containing the ammonia vapors through a bath of sulphuric acid, and has for its object an improved method whereby the pyridine content of the gases and the iron content of the sulphuric acid are prevented from forming pyridine sulphate and ferric sulphate, respectively, in sufficient quantities to form crystals and combine with the ammonium sulphate as impurities.

The sulphuric acid bath which is made up of water and approximately 4 to 8 per cent. free sulphuric acid is contained in a lead lined saturator. The gas with its tar and ammonia vapor, after leaving the coke ovens or other source, is cooled down to about 35 degrees centigrade, during which cooling process practically all the ammonia chloride vapors are dissolved and carried off with the ammonia gas liquor. The gas is then passed through tar extractors, to remove the last traces of tar fog, after which it is passed to the ammonia sulphate saturator.

The above are the usual steps followed in the recovery of by-products from coke oven and similar gases and will not be further described nor illustrated.

The accompanying drawing is an elevation partly in section, showing the ammonia sulphate saturator and its associated mechanisms.

Referring more particularly to the drawings, the numeral 2 designates the gas supply conduit leading from the tar extractors, (not shown) and divided into branches 3 and 4 which enter a sulphate of ammonia saturator 5 of usual form. An outlet pipe 6 leads from the saturator 5 to an acid separator 7 which serves to trap any acid carried from the saturator 5 by the gases. An outlet pipe 8 leads from the acid separator 7 to still other gas treating apparatus or any other point desired. The acid separator 7 is provided with a drain pipe 9 leading back into the saturator 5 to provide for the return of the trapped acid to the saturator.

Acid, from any suitable source, is supplied to the bath in the saturator 5, through the pipe 10, this pipe having a control valve 11 thereon.

The saturator 5 is provided with an ejector 12 adapted to remove the ammonium sulphate precipitated within the saturator and convey it to a drain table 14 where the major portion of the bath liquor is drained therefrom and returned through the drain 15 to the saturator. The ammonium sulphate is adapted to be paddled manually or otherwise removed from the table 14 into a centrifugal drier 16 of usual construction, where it is dried and finally discharged into the conduit 17 which delivers it upon a conveyer 18 which carries it to bins or other suitable places of storage (not shown).

As the gas passes through the acid bath in the saturator 5 the ammonia vapors are combined with the acid in the bath forming ammonium sulphate $(NH_4)_2SO_4$. At the same time a large portion of the pyridine vapors, which are also contained in coke oven and similar gases, are combined with the sulphuric acid of the bath, forming pyridine sulphate.

The acid bath in the saturator 5 continues to build up ammonium sulphate which remains in solution until the bath reaches a stage of saturation, after which crystals of ammonium sulphate are precipitated and fall to the bottom of the saturator 5 from which they are lifted by the ejector 12.

During the passage of the gas through the saturator 5 the pyridine content of the gas is also largely absorbed by the acid bath and forms pyridine sulphate. The bath gradually builds up with pyridine sulphate and after a certain strength of pydidine sulphate is attained in the bath, a portion thereof will be precipitated and removed with the ammonium sulphate, and cause an unstable condition in the crystallized ammonium sulphate.

The present invention provides a novel step in the recovery of ammonium sulphate which consists in periodically making the acid bath slightly alkaline, so as to thereby change the pyridine sulphate into pyridine oil which is carried off by the gases and prevent building up of pyridine sulphate in the acid bath.

It has been discovered that the pyridine content of the acid bath affects the formation of the crystals of ammonium sulphate and also makes it difficult to neutralize the dried ammonium sulphate crystals.

The unavoidable presence of the iron sulphate in commercial sulphuric acid used in forming the acid bath also has an objectionable influence on the quality of the ammonia sulphate produced in the acid bath in the saturator, due to the iron sulphate in solution reacting with the ammonia, hydrogen sulphide and cyanide in the gas and forming ferric sulphide and ferro-ferri cyanide which is a black precipitate discoloring the ammonia sulphate. It has also been discovered that when the acid bath is periodically made slightly alkaline, the iron in the acid bath is precipitated and may be carried off with the tar or more thoroughly removed by filtering the bath.

In carrying out the novel step of periodically making the acid bath slightly alkaline so as to depyridinize it and precipitate at least a major portion of the iron, as ferro-ferri cyanide, the acid supply to the bath, is periodically cut off and the gas with its ammonia vapors is allowed to continue to pass through the saturator until the bath becomes slightly alkaline. As the alkaline stage of the bath is reached the pyridine sulphate is separated into pyridine, which is carried off mechanically by the gas, and the iron, as ferro-ferri cyanide and ferric sulphide, is precipitated. The ferric sulphide and ferro-ferri cyanide which are precipitated when the bath is made alkaline, combine with the tarry matter that comes to the surface of the bath and may be either skimmed off or filtered out.

From the above it will be readily understood that this invention provides a novel step that may be readily applied to any of the usual methods of recovering ammonium sulphate from by-product coke and similar gases, in which the gases are passed through a saturator acid bath, which will eliminate in a simple and efficient manner the pyridine and iron content of said baths, and therefore provide for the precipitation of commercially pure ammonium sulphate.

While one specific method of rendering the saturator acid bath alkaline has been described, it will be understood that the invention is not limited thereto, but that various other methods may be employed to render the bath alkaline without departing from the scope of the appended claims.

I claim:

1. In the recovery of ammonium sulphate from gases distilled from coal, the method which includes the steps of passing such gases through a normally acid bath and periodically neutralizing the bath to depyridinize it and precipitate any ferric sulphide and ferro-ferri cyanide therein.

2. In the recovery of ammonium sulphate from gases distilled from coal, the steps consisting in passing such gases through a sulphuric acid bath and periodically making said bath slightly alkaline, to thereby depyridinize the bath and precipitate any ferric sulphide and ferro-ferri cyanide therein.

3. In the recovery of ammonium sulphate from gases distilled from the steps which consist in passing the gases through a sulphuric acid bath until said bath becomes saturated and crystals form and are precipitated, periodically rendering said bath sufficiently alkaline to separate the pyridine sulphate content of the bath into pyridine oil, and carrying off the oil, by the gases passing through the bath, and precipitating the iron as a cyanide, to be carried into the tar of the bath.

4. In the recovery of ammonium sulphate from gases distilled from coal, the steps consisting in passing such gases through a sulphuric acid bath until said bath becomes saturated and crystals form and are precipitated, making additions of acid sufficient to maintain said bath acid and stopping said acid supply at predetermined intervals and allowing the passage of the gases through the bath to continue until said bath becomes sufficiently alkaline to separate the pyridine sulphate therein into pyridine oil, which will be carried off by the gases passing through the bath, and precipitate iron in the bath as a ferro-ferri cyanide into the tar with which it will be readily taken up, and then continuing the normal operation by further additions of acid to said bath after each time it is made alkaline.

5. In the recovery of ammonium sulphate from gases distilled from coal, the steps consisting in passing such gases through a sulphuric acid bath, and periodically neutralizing said bath while continuing the passage of the gases therethrough, to thereby depyridinize the bath.

In testimony whereof I have hereunto set my hand.

FRANK F. MARQUARD.